Jan. 12, 1926.　　　　　　　　　　　　　　1,569,007
E. I. DODDS
STAY BOLT STRUCTURE FOR BOILERS
Filed Feb. 26, 1923
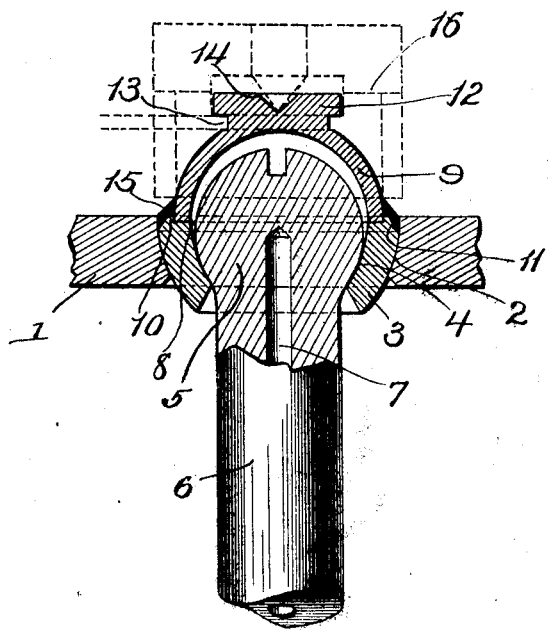
Inventor
E. I. Dodds
By Seymour & Bright
Attorneys Patented Jan. 12, 1926.

1,569,007

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA.

STAY-BOLT STRUCTURE FOR BOILERS.

Application filed February 26, 1923. Serial No. 621,381.

*To all whom it may concern:*

Be it known that I, ETHAN I. DODDS, a citizen of the United States, and a resident of Central Valley, in the county of Orange and State of New York, have invented certain new and useful Improvements in Stay-Bolt Structures for Boilers; and I do hereby declare the following to be a full, clear, and exact description of the invention, such as will enable others skilled in the art to which it appertains to make and use the same.

This invention relates to improvements in staybolt structures for boilers, and more particularly to such as embody an initially universal adjustable bearing member and closure for the same over the bolt head,—one object of my present invention being to provide a staybolt structure embodying an initially universal adjustable bearing member having a closure welded thereto and both the bearing member and closure welded to the boiler sheet with the use of a welding alloy, and to so construct the closure as to facilitate the application thereto of a cutting tool for removing the alloy to permit removal of the closure.

With this and other objects in view, the invention consists in certain novel features of construction and combinations of parts as hereinafter set forth and pointed out in the claims.

The drawing is a view in section showing an embodiment of my invention.

In the drawing I have shown at 1 a portion of the outer sheet of a boiler having a hole therein, the wall of which may be somewhat tapering and slightly rounded as indicated at 2. A bearing member 3 having a rounded exterior is adapted to have universally adjustable mounting on the seat in the boiler sheet afforded by the wall 2 of the opening therein. This bearing member is so proportioned as to extend approximately to the outer surface of the boiler sheet and is provided interiorly with a rounded seat 4 for the rounded head 5 of a staybolt 6,—the latter preferably provided with a telltale hole 7 which extends into the head 5. The outer end of the bearing member 3 is provided with an annular recess forming a seat 8 for the edge portion of a cap or closure 9 and a part of the upper end of the bearing member is beveled as at 10 and forms with a portion of the wall 2 an annular groove 11 for a purpose hereinafter explained. The cap or closure 9 is made with a head 12 and an annular groove 13 adjacent to said head,—the head 12 being also provided centrally with a tapering recess 14.

When the staybolt 6 shall have been properly aligned relatively to the respective boiler sheets, the bearing member 3 will be united with the boiler sheet 1 so as to be, in effect, rigid therewith, by means of a weld 15 which enters the annular groove 11 and the welding alloy of which said weld is composed is caused to also unite the cap or closure to the bearing member. Thus it will be seen that when my improvements are in use, the bearing member and cap will be rigidly secured together and both will be united to the boiler sheet.

When it is desired to remove the cap or closure in order to permit inspection of the staybolt or removal of a broken bolt, it is necessary to remove the welding alloy. My improved cap or closure facilitates the use of a cutting tool indicated by dotted lines 16,— said cutting tool being mounted on the cap or closure so that its cutting members may engage the welding alloy and remove the same when the tool is rotated. The cutting tool may be provided with a part to enter the annular groove 13 and with a projection to enter the conical recess 14 so that said tool may be readily rotated about the cap or closure.

Having fully described my invention what I claim as new and desire to secure by Letters-Patent, is:

1. In a staybolt structure, the combination with a boiler sheet having an opening and a bearing member having initial universally adjustable mounting in said opening, of a cap or closure mounted on said bearing member and a single weld encircling the cap or closure and bearing member and uniting both the bearing member and cap or closure to the boiler sheet, said cap or closure having a head formed with a recess providing a mounting adapted to receive a cutting tool for removing the welding alloy.

2. In a staybolt structure, the combination with a boiler sheet having an opening of a bearing member mounted in said opening to have initial universal adjustment, said bearing member having a beveled portion whereby a groove is formed between said bearing member and the wall of the opening in the boiler sheet, said bearing member also having an annular seat at its outer end, a cap or closure resting against said seat and provided with a centrally located head providing a mounting for a rotary cutting tool, and welding alloy encircling and engaging the cap or closure and the bearing member and entering the annular groove between the bearing member and the wall of the opening in the boiler sheet, whereby the bearing member and cap are united and both united with the boiler sheet.

In testimony whereof, I have signed this specification.

ETHAN I. DODDS.